United States Patent Office.

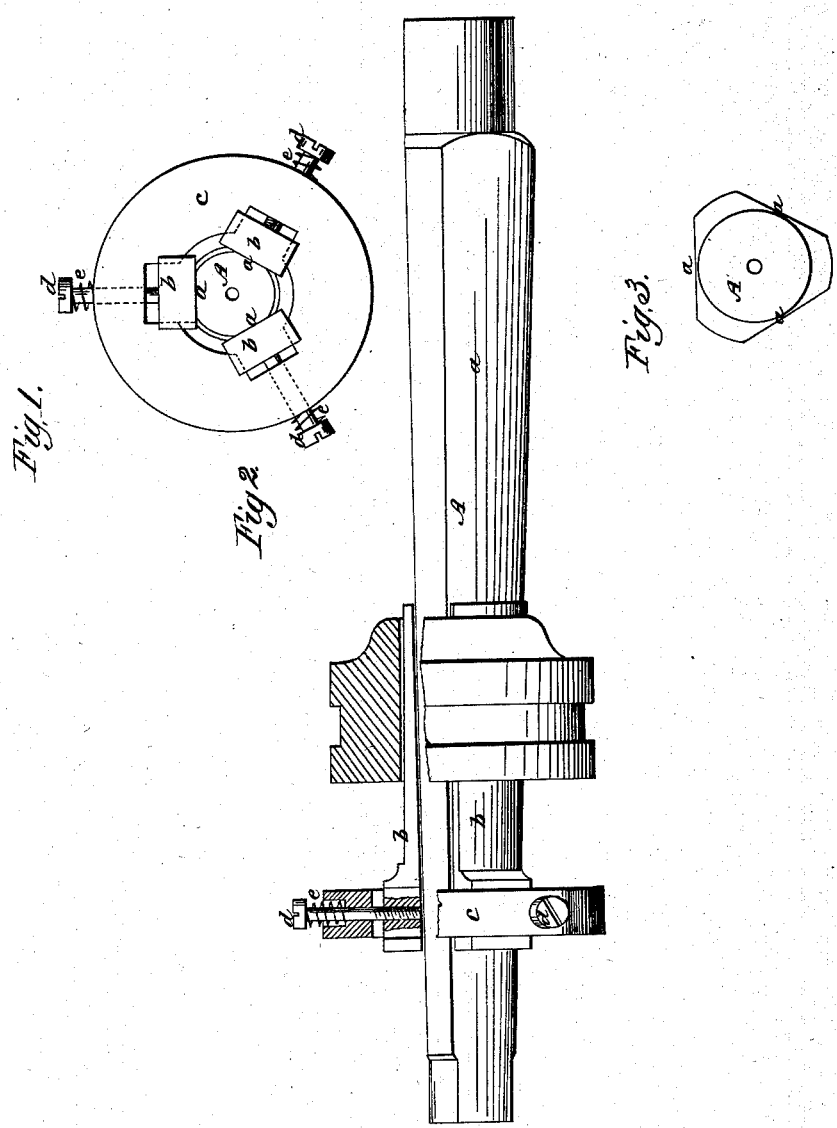

IMPROVED EXPANDING MANDREL.

ISRAEL BEETISON, OF NEW BRITAIN, CONNECTICUT.

Letters Patent No. 59,948, dated November 27, 1866.

SPECIFICATION.

TO ALL WHOM IT MAY CONCERN:

Be it known that I, ISRAEL BEETISON, of New Britain, in the county of Hartford, and State of Connecticut, have invented a new and improved Expanding Mandrel; and I do hereby declare that the following is a full, clear, and exact description thereof, which will enable others skilled in the art to make and use the same, reference being had to the accompanying drawings, forming part of this specification, in which—

Figure 1 represents a front view of this invention.

Figure 2 is a sectional side elevation of the same.

Figure 3 is an end view of the mandrel, or arbor, detached.

Similar letters of reference indicate like parts.

This invention consists in a tapering mandrel, which is flattened on three or more sides, in combination with three or more segmental wedges, which are fitted on the flattened sides of the mandrel and held in position by a suitable arrangement of a ring and screws in such a manner that by moving said wedges up or down the mandrel can be adjusted for different-sized holes, and one and the same mandrel can be used for turning a variety of articles with different-sized holes.

A represents a mandrel which is turned tapering from one end to the other, and flattened on three (or more) sides, $a$. On these flat sides are fitted segmental wedges, $b$, which are so shaped that their outer convex surfaces, when they are adjusted in the proper position on the mandrel, form portions of a cylinder or of a cone, as may be desired. Said segmental wedges are held in position on the mandrel by a ring, $c$, provided with a series of screws, $d$, and these screws are made to screw into the wedges merely to attach them to the ring. Springs $e$, under the heads of the screws, render the same yielding, so as to facilitate the entrance of the segmental wedges into the hole previous to driving the flattened tapering mandrel. By moving the wedges up or down on the mandrel, said mandrel can be adjusted for holes of different sizes, and pulleys or other articles can be turned on the same, the holes of which vary from one half to one inch. For instance, a mandrel can be made for one-inch holes up to one and a half inch or more, and another for one and a half to two-inch holes, and so forth, whereas with the usual solid mandrels a separate mandrel is required for every size hole, and these mandrels have to be turned and fitted whenever the holes vary in the least, whereas my mandrel can be readily adjusted to the hole, and no time is lost in fitting the mandrel.

What I claim as new, and desire to secure by Letters Patent, is—

1. The tapering mandrel A, flattened on three or more sides, in combination with the segmental wedges $b$, fitted on the flattened sides of the mandrel, substantially as and for the purpose described.

2. The rings $c$, provided with the screws $d$, in combination with the segmental wedges $b$, and mandrel A, constructed and operating substantially as and for the purpose described.

ISRAEL BEETISON.

Witnesses:
EDWARD CLARK,
STEPHEN NAPHY.